United States Patent [19]

Erokhin

[11] Patent Number: 5,637,244

[45] Date of Patent: Jun. 10, 1997

[54] METHOD AND APPARATUS FOR CREATING AN IMAGE BY A PULSED LASER BEAM INSIDE A TRANSPARENT MATERIAL

[75] Inventor: Alexander I. Erokhin, Moscow, Russian Federation

[73] Assignee: Podarok International, Inc., San Francisco, Calif.

[21] Appl. No.: 110,048

[22] Filed: Aug. 19, 1993

[30] Foreign Application Priority Data

May 13, 1993 [RU] Russian Federation ............. 93029023

[51] Int. Cl.⁶ ................................................... B23K 26/02
[52] U.S. Cl. ................... 219/121.69; 219/121.85; 219/121.75
[58] Field of Search ................. 219/121.68, 121.69, 219/121.73, 121.75, 121.85, 121.78

[56] References Cited

U.S. PATENT DOCUMENTS

| | | |
|---|---|---|
| 3,404,254 | 10/1968 | Jones . |
| 3,589,883 | 6/1971 | Dear . |
| 3,610,871 | 10/1971 | Lumley . |
| 3,627,858 | 12/1971 | Parts et al. . |
| 3,663,793 | 5/1972 | Petro et al. . |
| 3,695,497 | 10/1972 | Dear . |
| 3,740,524 | 6/1973 | Dahlberg et al. . |
| 3,787,873 | 1/1974 | Sato et al. . |
| 3,800,991 | 4/1974 | Grove et al. . |
| 3,832,948 | 9/1974 | Barker . |
| 3,909,582 | 9/1975 | Bowen . |
| 3,932,726 | 1/1976 | Verheyen et al. . |

(List continued on next page.)

FOREIGN PATENT DOCUMENTS

| | | |
|---|---|---|
| 0054840 | 6/1982 | European Pat. Off. . |
| 0368309 | 5/1990 | European Pat. Off. . |
| 2236666 | 2/1975 | France . |
| 2310229 | 12/1976 | France . |
| 2495982 | 6/1982 | France . |
| 52-121894 | 10/1977 | Japan . |
| 53-58562 | 5/1978 | Japan . |
| 56-169347 | 12/1981 | Japan . |
| 62-259690 | 11/1987 | Japan . |
| 4-143090 | 5/1992 | Japan . |
| 152358 | 9/1978 | United Kingdom . |
| 2092066 | 8/1982 | United Kingdom . |
| 1198045 | 7/1990 | United Kingdom . |
| WO89/07302 | 8/1989 | WIPO . |
| WO90/01418 | 2/1990 | WIPO . |
| 9203297 | 3/1992 | WIPO . |

OTHER PUBLICATIONS

"Laser Damage in Glass", British Journal of Applied Physics, 1965, vol. 16., pp. 751–752.

F. Tuma, "Beschriften mit Laserstrahlen", 1988, 3 pages.

D. Winkler, "Status quo beim Laserbeschriften", 1988, pp. 54–56.

"Effects of High Power Laser Radiation" By John Ready Academic Press, 1971 pp. 277–314.

*Primary Examiner*—Mark H. Paschall
*Attorney, Agent, or Firm*—Skjerven, Morrill, MacPherson, Franklin & Friel; Michael Shenker

[57] ABSTRACT

A method of creating an image inside a transparent material with the aid of a pulsed laser beam involves use of a diffraction limited Q-switched laser, in particular, a solid-state single-mode TEM$_{00}$ laser; sharp focusing of the laser beam to provide an adjustable microdestruction in the material being treated; and mutual displacement of the laser beam and the material being treated after each laser shot to a next point of the image being reproduced. The microdestruction induced in the material at a pre-set point is adjustable in size by varying the actual aperture of the focusing lens and laser radiation power simultaneously. A device for carrying out said method comprises a laser 1, a defocusing lens 2 having a variable focal length, a focusing lens 4 capable of performing controlled motion along the laser beam 3 with the aid of an actuator 5, a drive 7 moving a specimen 6 made of a transparent material in a plane perpendicular to the laser beam 3, and a computer 8 guiding the process of specimen 6 treatment.

15 Claims, 3 Drawing Sheets

U.S. PATENT DOCUMENTS

| | | |
|---|---|---|
| 4,092,518 | 5/1978 | Merard . |
| 4,289,378 | 9/1981 | Remy et al. .............................. 350/174 |
| 4,325,769 | 4/1982 | Moyse et al. . |
| 4,467,172 | 8/1984 | Ehrenwald et al. . |
| 4,651,283 | 3/1987 | Sciaky et al. . |
| 4,735,670 | 4/1988 | Maurer et al. ........................ 156/272.8 |
| 4,743,463 | 5/1988 | Ronn et al. . |
| 4,758,703 | 7/1988 | Drever et al. . |
| 4,769,310 | 9/1988 | Gugger et al. . |
| 4,822,973 | 4/1989 | Fahner et al. . |
| 4,843,207 | 6/1989 | Urbánek et al. . |
| 5,171,963 | 12/1992 | Saruta et al. . |
| 5,206,496 | 4/1993 | Clement et al. ......................... 250/271 |
| 5,300,756 | 4/1994 | Cordingly ........................... 219/121.69 |
| 5,313,193 | 5/1994 | Dubois et al. . |

METHOD AND APPARATUS FOR CREATING AN IMAGE BY A PULSED LASER BEAM INSIDE A TRANSPARENT MATERIAL

BACKGROUND OF THE INVENTION

The present invention relates in general to laser technology for treatment of transparent materials and more specifically to a method and apparatus for creating an image inside a transparent material, using a pulsed laser beam.

Some methods and apparatus were previously known for creating a variety of images inside and on the surface of a transparent material, using a pulsed laser radiation emitted by a solid-state laser.

One of such methods of image creation in a transparent material of the Plexiglas type is disclosed in U.S. Pat. No. 4,092,518 of May 30, 1978, Int. Cl. B23K27/00 or Nat.Cl. 219/121.

The method is as follows: a cylindrical article made of a transparent material is placed with its flat edge towards the laser beam and the laser radiation having a pulse duration in the range of 100 to 300 microseconds is focused inside the article using an optical lens.

The effect of the laser pulse creates a number of three-dimensional macrodestructions appearing as fanned out cracks.

A variety of such macrodestructions are produced in the article of a transparent material by changing the depth of laser beam focusing along the length of the article. The macrodestructions are shaped predominantly as saucers-like cracks of different size arranged randomly around the focal point thus establishing an optical decorative effect inside the transparent material.

Such a decorative effect is appreciably intensified when the said article is illuminated.

Used as a device for practical realization of said method is a multimode solid-state free-running pulsed laser and a convergent lens having a focal length from 100 to 200 mm for focusing laser radiation. Cylindrical articles of a transparent material having a diameter of 35 to 80 mm and a length of 85 to 205 mm are recommended for laser treatment.

The said technology enables three-dimensional but uncontrolled and abstractly shaped images to be obtained, which produce a decorative effect.

Moreover, the said technology fails to reproduce any desired image, accounting an uncontrolled behavior of macrodestructions occurring in the material being laser-treated.

Another known method of creating a pre-set image (e.g. image being copied by an optical camera) on the surface of a transparent material by a laser beam is disclosed in U.S. Pat. No. 4,843,207 issued on Jun. 27, 1989, IPC B23k26/00 or NPC 219/121. That patent discloses a method and a device for producing, by a laser beam, a decorative ornament on products made of a transparent material and having a hollow axially symmetrical cap-like shape.

The method comprises preconditioning of a product made of a transparent material, including forming a coating on the blank outer surface, being at least 1.2 mm thick and made of material featuring over 75% absorption of laser radiation at its operating wavelength.

Said coating may be formed either by a layer of colored glass or by a layer of precious metal.

A laser beam having a wavelength of 0.5 to 2.0 micrometers acts upon the external absorbing coating of the hollow product through the thick internal wall, thus causing a phase change on the external surface. The laser beam and the product treated by the beam mutually move so that the laser beam is focused on the surface.

To carry out the said method a device is used comprising a solid-state pulsed laser featuring an acoustooptic Q-switch, an optical lens and a mirror, both being movable along the axis of symmetry of the hollow product in such a manner that laser radiation is focused on the product's external surface being treated, while the mirror is capable of rotating.

All the motions mentioned above are controlled and monitored by a microcomputer and an optical camera which copies the pattern of a decorative ornament reproduced by the laser beam on the external surface of the product.

The discussed above known technology when applied for artistic treatment of glass makes it possible to impart adequately high decorative properties thereto.

However, such technology imposes some restrictions, that is, the product must be hollow and the maximum thickness of its wall is about 40 mm; a product made of a transparent material must be preconditioned on its external surface; the image being reproduced can be made only on the surface of the article.

SUMMARY OF THE INVENTION

The present invention has therefore for its principal task to provide a method and apparatus for creating an image, with the aid of the pulsed laser beam, inside a transparent material, both said method and said device being so improved as to attain microdestructions adjustable in size and located at any point of the material so as to create a pre-set image.

The foregoing problem is accomplished due to the provision of a method for creating an image inside a transparent material by a pulsed laser beam, according to which the laser beam is periodically focused at pre-set points of the transparent material and the duration and power of the laser beam pulse are selected to be sufficient to produce destructions in the material. According to the invention, the present technical solution is not obvious in establishing a diffraction-limited beam of a Q-switched laser whereupon the laser beam is sharp focused to produce a size-adjustable microdestruction in the material being treated. Both the material and the laser beam are mutually displaced to a next point of the image being reproduced after each laser shot.

For realization of the proposed method it is recommended to use single-mode, TEM$_{00}$ solid-state Q-switched laser as a diffraction limited source of radiation.

It is preferable to carry out sharp laser beam focusing by preliminary adjustable defocusing of radiation by a divergent lens whose focal length determines the actual aperture of the focusing lens which makes it possible, while maintaining constant radiation intensity at the focus, to change the energy of laser radiation, thereby controlling the size of the microdestruction at the laser beam focus.

A device for carrying out the proposed method of creating an image inside a transparent material with the aid of a pulsed laser beam comprises a pulsed laser itself, an optical lens adapted to focus the laser beam inside the material and to move the focus along the laser beam, mechanical driving means for mutual displacement of the laser beam and the material, and a computer operatively associated with the laser and the mechanical driving means. According to the invention, the pulsed laser used in the device is essentially a diffraction-limited Q-switched laser, a variable focal length defocusing lens is interposed between the pulsed laser and the focusing lens, said defocusing lens being adapted for changing the occupancy of the actual aperture of the focusing lens. The mechanical driving means for mutual displacement of the transparent material and the laser beam is shaped as a single-axis and two-axis motion mechanism.

Adjusting microdestructions characteristics it is possible now to produce three or two-dimensional images of a pre-set pattern in transparent materials having various shapes and mechanical features, e.g. hardness.

BRIEF DESCRIPTION OF THE DRAWINGS

The present invention will be more apparent from the following description of more specific exemplary embodiments thereof with reference to the accompanying drawings, wherein.

DESCRIPTION OF THE PREFERRED EMBODIMENTS

Figure 1:
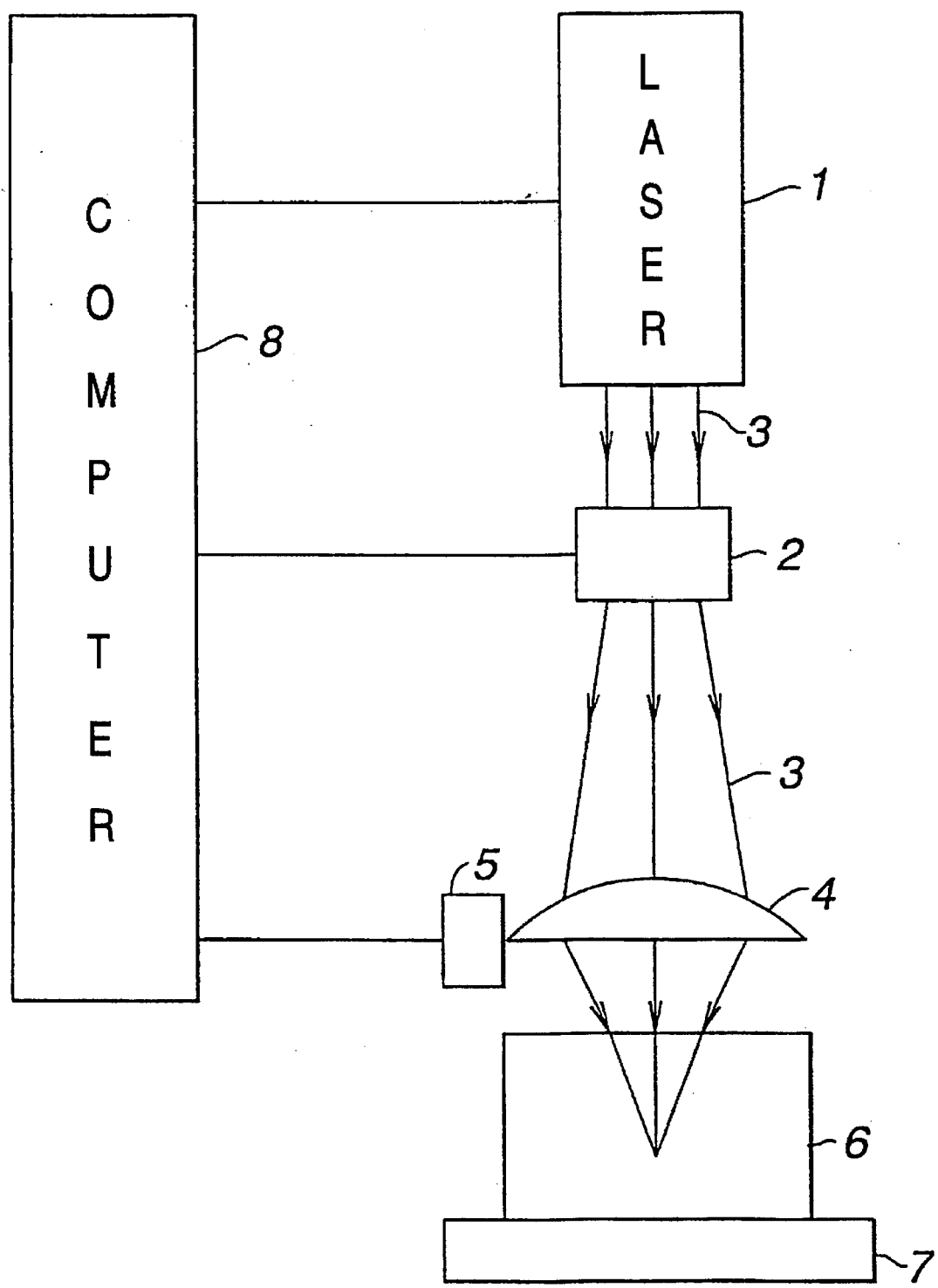
FIG. 1 is a schematic diagram of apparatus for carrying out a method of creating an image inside a transparent material, using a laser beam, according to the invention.

To provide a better understanding of the essence of the proposed method it is expedient first to consider a schematic diagram of the apparatus for carrying out said method as shown in FIG. 1.

The device comprises a solid-state pulsed laser 1 fixed in a stationary position; a variable focal length defocusing divergent lens 2 fixed stationary on the axis of the laser beam 3; a focusing lens 4 located on the axis of the laser beam 3 wherein lens 4 can be moved controllably along said axis with the aid of actuator 5; a specimen 6 of a transparent material arranged across the path of the focused laser beam 3, the specimen 6 being capable of moving in a plane orthogonal to the laser beam 3, with the aid of a drive 7.

The drive 7 may be in fact a plotter of the heretofore-known construction.

A computer 8 is provided to control the operation of the pulsed laser 1, actuator 5 and drive 7 for displacing the focusing lens 4 and the specimen 6. In addition, the computer 8 controls the focal length of the defocusing divergent lens 2 which is similar to the commonly known photographic camera lenses with a variable focal length.

It is a $TEM_{00}$ laser that proves to be most suitable for the purpose.

Selection of such a laser is due to the greatest brightness of radiation emitted by said laser at a given power.

Use of a laser featuring a lower brightness-to-power ratio leads to an undesirable effect of self-focusing. It has been found that exceeding the self-focusing threshold by laser radiation power results in laser beam self-trapping into a number of strings. To avoid this disadvantage one must provide that laser radiation power be lower than self-focusing threshold.

Nevertheless, in order to initiate breakdown at the focal point it is necessary to exceed the threshold breakdown intensity at a given point. It is the laser type selected herein that features the maximum intensity-to-radiation power ratio at the focal point at a given focusing geometry.

Figure 2:
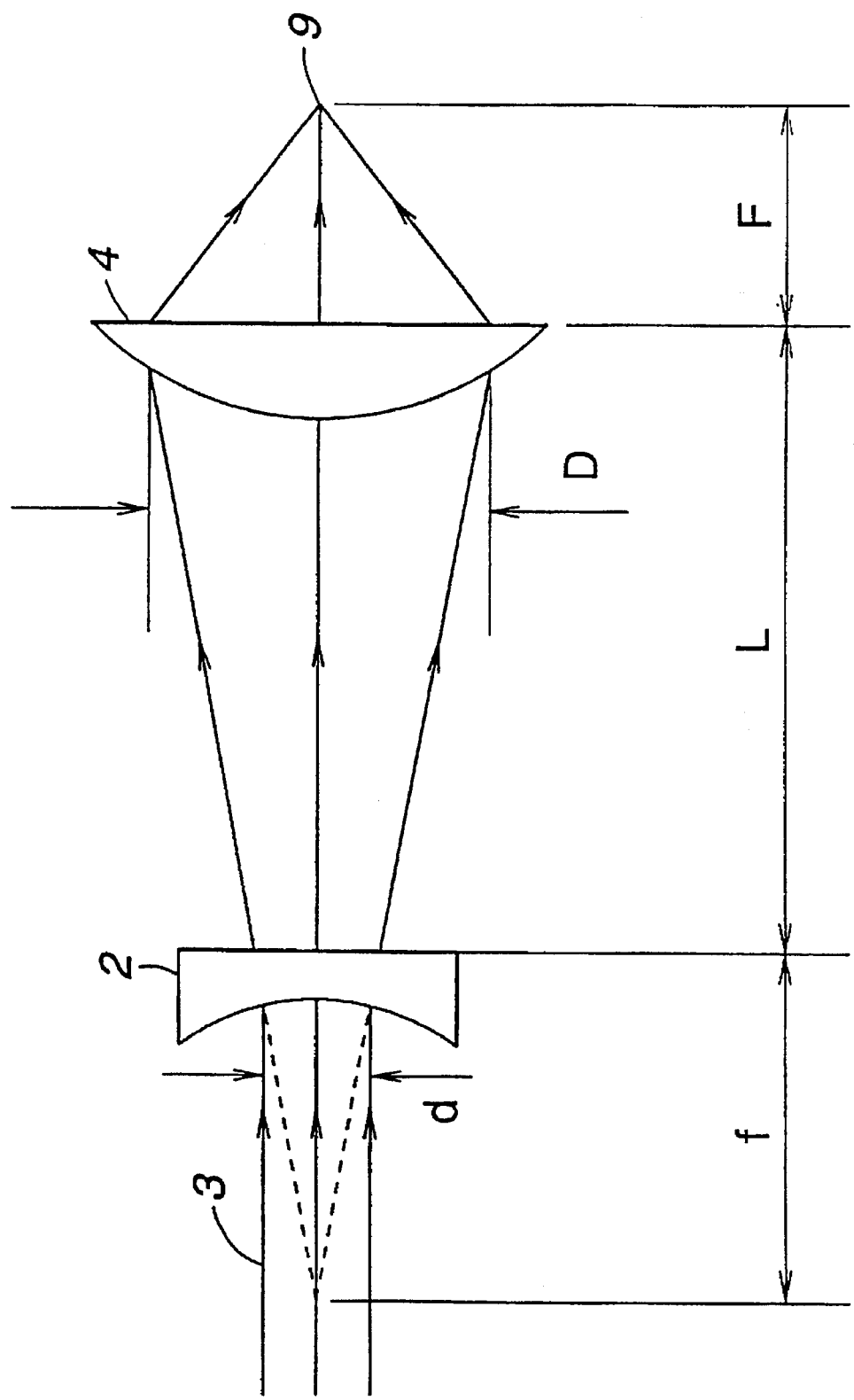
FIG. 2 is a schematic diagram of sharp focusing of a beam of the pulsed laser for realization of the method proposed in the present invention.

Another peculiar feature of the selected laser type resides in utilizing utmost possibilities of sharp radiation beam focusing, which is schematically represented in FIG. 2.

A sharp laser radiation focusing necessary for normal operation of the apparatus is carried out as follows.

The laser radiation beam 3 having a diameter d is incident upon the defocusing lens 2 and emerges therefrom in a diverging form to get into the aperture of the focussing lens 4 and having a diameter D which is found from the formula $$D=d(L+f)/f,$$

where L is the distance between the lenses
f is the focal length of the defocusing lens
In a case of aberrationless focusing by the lens 4 the focal spot dimension is characterized by the value $$((lamda)/D)*F,$$

where (lamda) is the radiation wavelength of the laser used;
F is the focal length of the focusing lens.
The intensity of the laser radiation at a focal spot 9 is found from the formula $$I=P/S,$$

where P is the power of laser radiation,
S is the effective area of the focal spot.
It results from this formula that the intensity of laser radiation is proportional to the following expression $$(P/(lamda)squared)*(D/F)squared.$$

When calculating the value of the radiation intensity at the focus of a multimode laser the above expression is to be divided by squared ratio between the beam divergence of the laser used and diffraction-limited divergence thereof. Compensation of focusing loss by increasing the radiation power will result in an undesired increase in the part played by self-focusing. Increase in the second factor in the above expression is restricted by aberration of the focusing lens 4.

The parenthesized relation D/F defines the focusing sharpness, whence it ensues that the maximum laser radiation intensity in the focus point for a given radiation power is attainable at a sharpest aberration-free focusing of a single-mode laser beam.

The shorter the focal length F of the defocusing divergent lens 2, the sharper the focusing of the laser radiation and the higher its intensity. Thus, a desired intensity of laser-induced breakdown at the focus point is attainable with lower power consumption, thereby making it possible to create a laser-produced destruction area having smaller linear dimensions.

Consequently, by adjusting the focal length of the lens 2 and hence the laser radiation power one can control the size of the destruction area in the specimen 6 made of a transparent material, which allows reproducing a half-tone picture.

Figure 3B:
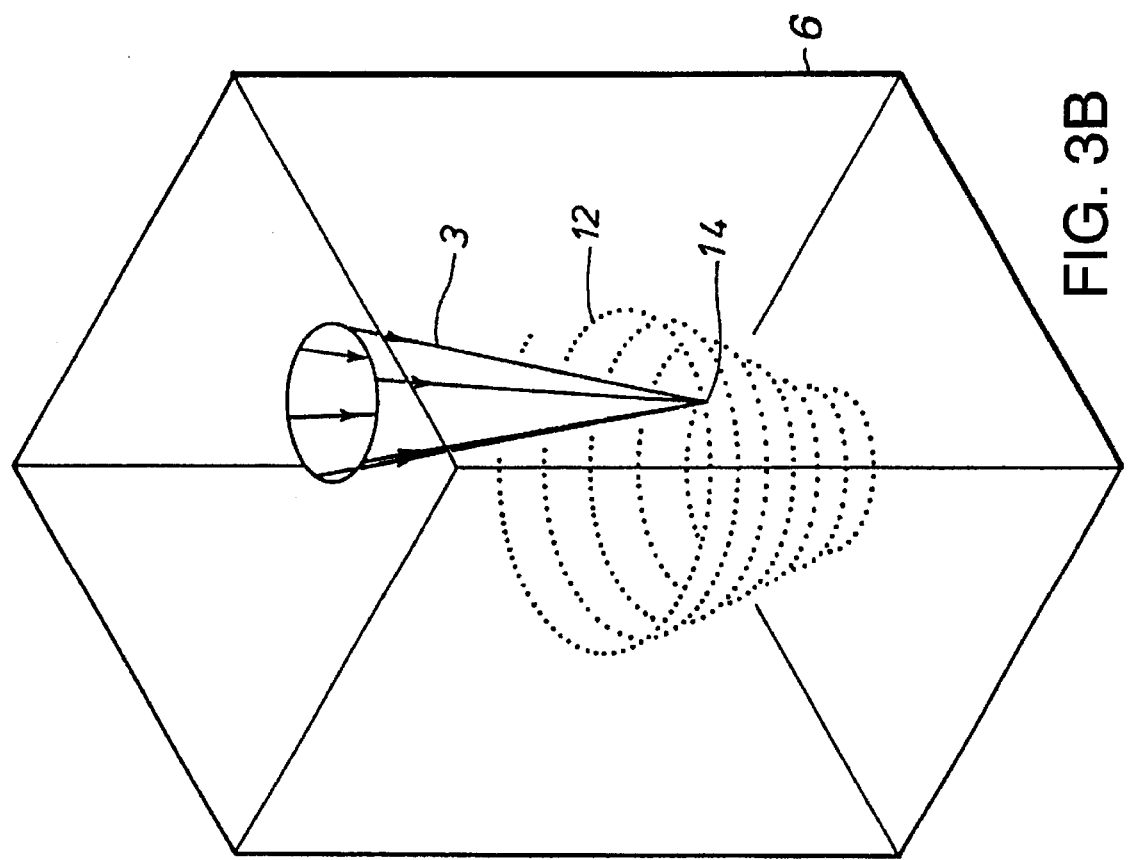
FIG. 3 is a schematic diagram of reproduction of a copy of an image stored in a computer memory performed by a laser beam inside a specimen of a transparent material.
Figure 3A:
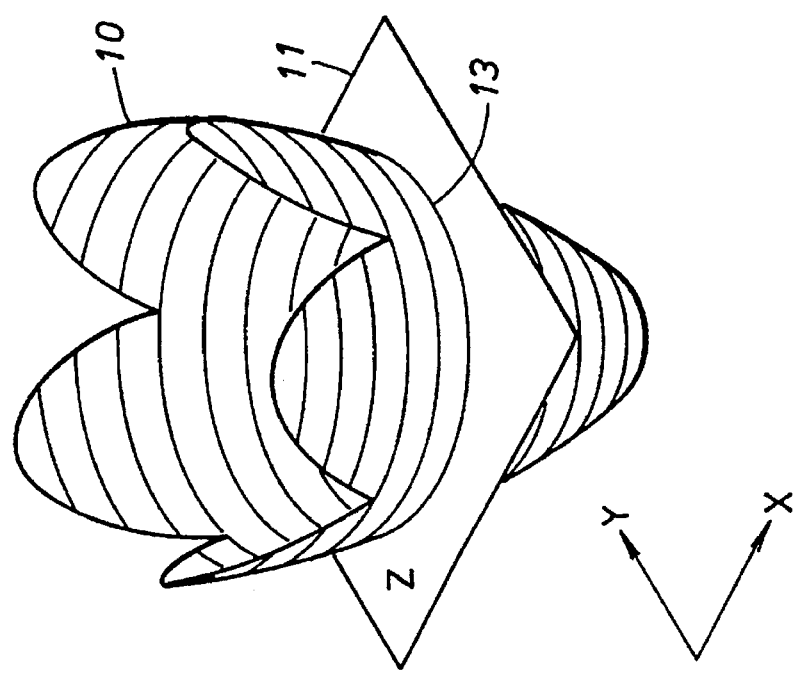

In principal, the proposed technology of creating a three-dimensional or two-dimensional image in a light-transparent material can be applied under manual control of the laser 1 by changing the laser beam focusing sharpness and the radiation power thereof before each shot. However, the image creation process will in such case be of low productivity. To accelerate the process a computer monitoring of system operation is used, which can be illustrated by a detailed description of the schematic diagram presented in FIG. 3.

An image 10 of the object to be reproduced is written into the memory of computer 8 as a number of sections made by parallel planes 11 defined by the coordinate Z. Each of the sections 11 appears as an array of picture elements (dots) situated in a plane (X,Y) and adjoining one another.

Transfer of the image 10 inside the specimen 6 of a transparent material and reproduction of a replica 12 of the image 10 therein consist in a consecutive representation of each point 13 from the three-dimensional space of the image 10 by a respective point 14 of the specimen 6 with the aid of the laser beam 3. The process of transferring the image 10 is carried out by layer-after-layer filling of the section 11, beginning with the lowest one. The actuators 5 and drive 7 controlled by the computer 8 make the focus point of the laser beam 3 coincident with the point 14 inside the specimen 6, adjust the focal length of the defocusing divergent lens 2 for a value required to produce microdestruction of a pre-set size, and the computer 8 guides the laser 1 to generate a pulse having a power sufficient for breakdown, whereupon a next point on the same section 11 is to be reproduced, for which purpose the specimen 6 is displaced with the aid of the drive 7.

Having completed reproduction of the points 13 of the section 11 the computer 8 guides the actuator 5 for displacing the focusing lens 4 to a position corresponding to laser beam focusing in a new superjacent section 11. Further on the process continues in the aforementioned order.

It is obvious that whenever it is necessary to create a flat (two-dimensional) image in the specimen 6 of a transparent material rather than a three-dimensional image, it will suffice for this purpose to have a single section in the program of the computer 8 that corresponds to the image desired.

It has been stated hereinbefore that the technology disclosed herein enables transparent materials of various shapes and having diverse mechanical characteristics to be treated. Among such materials may be organic and inorganic glass, naturally occurring and synthetic crystals, including tinted ones, provided that the tint does not sufficiently diminish the transmission of the laser beam, as well as transparent polymer materials, and wide-gap semiconductors.

Given below are some examples of treatment of certain light-transparent materials, using the method proposed herein.

Example 1

A three-dimensional image was created in a specimen made of silicate glass having a refractive index of 1.505 at an optical wavelength of 1.06 micrometers.

The specimen was rectangular in shape having its side faces several centimeters long (up to 10 cm) and featured a smooth plain surface on the side of laser beam penetration thereinto.

$TEM_{00}$ radiation was used emitted by a Nd:YAG laser having a wavelength of 1.06 micrometers and a pulse duration of the order of 15 ns, the radiation power ranging from 5 to 15 mJ.

A sharp focusing of the laser beam was performed in a way described hereinbefore. The focal spot was adjusted for size with the aid of a focusing lens having a focal length from 2 to 5 cm, while the actual aperture of said lens varied from 5 to 15 mm, which influenced appreciably the size of the focal spot and hence the destructed area in the specimen.

The size of the destructed area varied between 0.1 and 0.4 mm. The thus-created three-dimensional image inside the blank was constituted by a plurality of points.

Example 2

A three-dimensional image was created in a specimen of synthetic quartz grown from a gaseous phase and having a refractive index of 1.45 at an optical wavelength of 1.06 micrometers. The cubic specimen having its side faces several centimeters long (up to 10 cm) faced towards the laser beam with one of its flat sides during treatment.

Use was made of the $TEM_{00}$ radiation emitted by an Nd:YAG laser having a wavelength of 1.06 micrometers and a pulse duration of 15 ns, the radiation power varying from 10 to 30 Mj.

A sharp focusing of the laser beam was carried out in a way described hereinabove. The side of the focal length was adjusted by means of a focusing lens having a focal length of 2 to 5 cm. The actual aperture of the focusing lens varied from 5 to 15 mm and the size of the destructed area ranged from 0.1 to 0.4 mm.

The thus-created three-dimensional image inside the specimen was also constituted by a plurality of points.

To attain similar results when treating the purest and optically strongest transparent materials the power of a laser radiation pulse is to be increased not more than two fold compared with the radiation power applied for treatment of silicate glass.

When treating transparent polymer materials the power of a laser radiation pulse can be reduced by an order of magnitude compared with the radiation power applied for treatment of silicate glass.

As regards industrial applicability the present invention can find application for artistic treatment of glass, as well as for internal and external engraving of crystals.

I claim:

1. A method for forming a predetermined half-tone image inside a transparent material, the method comprising:

determining points inside the transparent material at which points microdestructions are to be created to form the half-tone image; and focusing a laser beam at each of the points to create a microdestruction at each of the points, wherein the microdestructions collectively form the predetermined half-tone image inside the transparent material, and wherein the focusing step comprises:

creating microdestructions of a first size to form a first portion of the image; and creating microdestructions of a second size different from the first size, to form a second portion of the image:

wherein the microdestructions of the different first and second sizes create a half-tone visual effect.

2. The method of claim 1 further comprising:

using a diffraction-limited Q-switched laser for generating the laser beam;

selecting the duration and power of a pulse of said laser beam sufficient for inflicting a microdestruction upon said transparent material; and displacing mutually said transparent material and said laser beam to a next point of the image being reproduced in order to establish a next microdestruction.

3. A method according to claim 2, wherein said diffraction-limited Q-switched laser is a solid-state single-mode $TEM_{00}$ laser.

4. A method according to claim 1, wherein said focusing step comprises:

preliminary defocusing of said laser beam with the aid of a divergent lens;

focusing the laser beam by a focusing lens after the laser beam has been defocused by the divergent lens;

changing the focal length of said divergent lens in order to modify the size of the focusing lens' region on which the laser beam impinges; and adjusting the size of the destructed area at the focus point of the laser beam by simultaneous variation of said laser power and the size of the focusing lens' region on which the laser beam impinges.

5. The method of claim 1 wherein the half-tone image is a decorative image.

6. The method of claim 1 wherein:

the step of focusing the laser beam comprises passing the laser beam through a first lens;

the step of creating microdestructions of a first size comprises focusing the laser beam so that the first lens' region on which the laser beam impinges has a size S1; and the step of creating microdestructions of a second size comprises focusing the laser beam so that the first lens' region on which the laser beam impinges has a size S2 different from S1.

7. The method of claim 1 wherein:

the step of creating microdestructions of a first size comprises focusing the laser beam of a first radiation power; and the step of creating microdestructions of a second size comprises focusing the laser beam of a second radiation power different from the first radiation power.

8. The method of claim 6 wherein:

the first lens is a focusing lens;

the step of focusing the laser beam further comprises passing the laser beam through a variable focal length defocusing lens before passing the laser beam through the focusing lens;

the step of focusing the laser beam so that the first lens' region on which the laser beam impinges has a size S1 comprises setting the focal length of the defocusing lens to a first value; and the step of focusing the laser beam so that the first lens' region on which the laser beam impinges has a size S2 comprises setting the focal length of the defocusing lens to a second value different from the first value.

9. The method of claim 6 wherein the step of focusing the laser beam at a point comprises, for at least one point P, moving the first lens relative to the transparent material to change a distance between the first lens and a surface of the transparent material in order to make the focus of the laser beam coincide with the point P.

10. The method of claim 1 comprising transferring the predetermined image from a computer memory to the transparent material, wherein the transferring step comprises the determining and focusing steps.

11. A method for forming a predetermined decorative image inside a transparent material, the method comprising:

determining points inside the transparent material at which points microdestructions are to be created to form the decorative image; and focusing a laser beam at each of the points to create a microdestruction at each of the points, wherein the microdestructions collectively form the predetermined decorative image inside the transparent material, wherein the focusing step comprises moving the transparent material relative to the laser beam perpendicularly to the laser beam to create microdestructions that form a first two-dimensional plane section of the decorative image, said first plane section appearing as a first array of image elements of the decorative image.

12. The method of claim 11 further comprising, after creating the first plane section of the decorative image, creating a second two-dimensional plane section of the image, the second plane section being between the first plane section and a source of the laser beam and appearing as a second array of image elements of the decorative image.

13. An article of manufacture comprising:

transparent material; and a plurality of microdestructions inside the transparent material, the microdestructions forming a half-tone image inside the transparent material, wherein the microdestructions vary in size to create a half-tone visual effect.

14. The article of claim 13 wherein the image is a three-dimensional decorative image.

15. A method for forming a predetermined image inside a transparent material, the method comprising:

determining points inside the transparent material at which points microdestructions are to be created to form the image; and focusing a laser beam at each of the points to create a microdestruction at each of the points, wherein the microdestructions collectively form the predetermined image inside the transparent material, wherein the focusing step comprises:

creating microdestructions of a first size to form a first portion of the image; and creating microdestructions of a second size different from the first size, to form a second portion of the image.

* * * * *